(12) United States Patent
Gao

(10) Patent No.: US 12,461,546 B1
(45) Date of Patent: Nov. 4, 2025

(54) TEMPERATURE-SENSITIVE PTC HEATING WIRE AND CONTROL METHOD THEREFOR

(71) Applicant: Liping Gao, Yuyao (CN)

(72) Inventor: Liping Gao, Yuyao (CN)

( * ) Notice: Subject to any disclaimer, the term of this patent is extended or adjusted under 35 U.S.C. 154(b) by 0 days.

(21) Appl. No.: 19/226,647

(22) Filed: Jun. 3, 2025

(51) Int. Cl.
*G05D 23/24* (2006.01)
*H05B 3/18* (2006.01)

(52) U.S. Cl.
CPC ........... *G05D 23/2401* (2013.01); *H05B 3/18* (2013.01); *H05B 2203/007* (2013.01); *H05B 2203/02* (2013.01)

(58) Field of Classification Search
CPC .................. G05D 23/2401; H05B 3/18; H05B 2203/007; H05B 2203/02
See application file for complete search history.

(56) References Cited

U.S. PATENT DOCUMENTS

| | | | | |
|---|---|---|---|---|
| 5,861,610 | A * | 1/1999 | Weiss ..................... | G05D 23/24 219/505 |
| 6,768,086 | B2 * | 7/2004 | Sullivan ................. | H05B 3/342 219/217 |
| 7,180,037 | B2 * | 2/2007 | Weiss ..................... | G05D 23/24 219/505 |
| 2008/0251509 | A1 * | 10/2008 | Robst .................... | H05B 1/0272 29/622 |
| 2011/0204040 | A1 * | 8/2011 | Wang ..................... | H05B 1/02 219/490 |
| 2012/0199574 | A1 * | 8/2012 | Weiss ..................... | H05B 3/56 219/481 |
| 2013/0134149 | A1 * | 5/2013 | Weiss ..................... | H05B 3/56 219/481 |
| 2020/0120760 | A1 * | 4/2020 | Hu .......................... | H05B 3/18 |
| 2022/0378110 | A1 * | 12/2022 | Yu .......................... | G05D 23/2401 |
| 2024/0357710 | A1 * | 10/2024 | Zhang .................... | H05B 3/10 |
| 2024/0419198 | A1 * | 12/2024 | Lee ......................... | G05D 23/1902 |

FOREIGN PATENT DOCUMENTS

| | | |
|---|---|---|
| CN | 207366093 U | 5/2018 |
| CN | 110677937 A | 1/2020 |
| CN | 210491245 U | 5/2020 |

* cited by examiner

*Primary Examiner* — Elizabeth M Kerr
*Assistant Examiner* — Keith Brian Assante
(74) *Attorney, Agent, or Firm* — Nitin Kaushik

(57) ABSTRACT

This application discloses a temperature-sensitive PTC heating wire and a control method therefor, and relates to a heating device and a control method therefor. The temperature-sensitive PTC heating wire includes a first metal wire, a temperature detection module, and a temperature regulation module. The first metal wire is configured to generate heat when being powered on, and has a known temperature-resistance relationship and a positive temperature coefficient (PTC) characteristic. The temperature detection module is configured to acquire a real-time resistance of the first metal wire, and calculate a real-time temperature of the first metal wire on the basis of the temperature-resistance relationship. The temperature regulation module is configured to compare the real-time temperature with a preset target temperature, and regulate the real-time temperature to the preset target temperature by means of closed-loop control.

8 Claims, 2 Drawing Sheets

TEMPERATURE-SENSITIVE PTC HEATING WIRE AND CONTROL METHOD THEREFOR

TECHNICAL FIELD

The present application relates to a heating device and a control method therefor, and in particular to a temperature-sensitive PTC heating wire and a control method therefor.

BACKGROUND

Existing heating wires typically rely on multiple external NTC temperature sensors to accurately monitor temperature changes, which significantly increases system complexity and cost. Over prolonged use, these temperature sensors may experience aging or reduced accuracy, leading to delayed responses or even errors in temperature control systems, thereby failing to effectively regulate temperature. This not only affects temperature control precision but may also cause temperature fluctuations, degrading user experience.

SUMMARY

An embodiment of this application provides a temperature-sensitive PTC heating wire and a control method therefor, aiming to solve the problem that existing temperature-sensitive PTC heating wires rely on multiple NTC temperature sensor probes to control heating effects.

In an aspect, an embodiment of the present application provides a temperature-sensitive PTC heating wire, including a first metal wire, a temperature detection module, and a temperature regulation module;
 the first metal wire is configured to generate heat after being powered on;
 the first metal wire has a known temperature-resistance relationship and a positive temperature coefficient (PTC) characteristic;
 the temperature detection module is configured to acquire a real-time resistance of the first metal wire, and calculate a real-time temperature of the first metal wire on the basis of the temperature-resistance relationship; and
 the temperature regulation module is configured to compare the real-time temperature with a preset target temperature, and regulate the real-time temperature to the preset target temperature by means of closed-loop control.

In a possible embodiment, the temperature detection module includes:
 a constant current source module, configured to provide a constant current to the first metal wire;
 a voltage acquisition unit, configured to acquire a real-time voltage across both ends of the first metal wire in real time.
 an analog-to-digital conversion module, configured to calculate a real-time resistance value of the first metal wire on the basis of the real-time voltage and the constant current; and
 a temperature calculation unit, configured to convert the real-time resistance value into a real-time temperature value.

In a possible embodiment, the constant current source module provides a constant current ranging from 10 mA to 200 mA.

In a possible embodiment, two voltage sampling points of the voltage acquisition unit are respectively provided at a connection between an output terminal of the constant current source module and one end of the first metal wire, and at a connection between a ground terminal of the constant current source module and the other end of the first metal wire.

In a possible embodiment, the temperature regulation module includes:
 a comparison unit, configured to compare a real-time temperature value with a preset target temperature value to generate a temperature error signal;
 a closed-loop control unit, configured to generate a closed-loop control signal on the basis of the temperature error signal; and
 a driving unit, configured to regulate an output power of a power supply on the basis of the closed-loop control signal, so as to control a heating power of the first metal wire.

In a possible embodiment, the temperature-sensitive PTC heating wire further includes a supporting core and a first cladding layer;
 both the supporting core and the first cladding layer are made of an insulating material;
 the first metal wire is helically wound around the supporting core at a set first pitch; and
 the first cladding layer is wrapped around the first metal wire.

In a possible embodiment, the temperature-sensitive PTC heating wire further includes a second metal wire and a second cladding layer;
 the second metal wire is helically wound around the outer sidewall of the first cladding layer at a set second pitch; and
 the second cladding layer is wrapped around the second metal wire.

In a possible embodiment, the first metal wire is a nickel wire, and the second metal wire is a copper wire.

In a possible embodiment, both the first cladding layer and the second cladding layer are polyvinyl chloride layers, and the first cladding layer and the second cladding layer each have a thicknesses ranging from 0.1 mm to 0.5 mm.

In an aspect, an embodiment of the present application provides a control method for a temperature-sensitive PTC heating wire, the method including steps of:
 acquiring a real-time resistance of a first metal wire, and calculating a real-time temperature of the first metal wire on the basis of a temperature-resistance relationship,
 the first metal wire having a known temperature-resistance relationship and a positive temperature coefficient (PTC) characteristic; and
 comparing the real-time temperature with a preset target temperature, and regulating the real-time temperature to the preset target temperature by means of closed-loop control.

This application has beneficial effects as follows.

The first metal wire having a known temperature-resistance relationship and a positive temperature coefficient (PTC) characteristic serves as both a heating wire and a temperature sensor, eliminating the need for an additional NTC temperature sensor probe while ensuring controllable heating temperatures. The temperature-sensitive PTC heating wire of the present application can be installed within textiles, providing uniform and controllable heating temperatures. The heating temperature can be regulated to a desired warmth level for the human body without the need for an additional NTC temperature sensor probe.

Other features and advantages of the present application will be described in the following description, and some will become apparent from the description or may be understood through the implementation of the present application. The objectives and other advantages of the present application may be realized and obtained by the structures particularly pointed out in the written description, claims, and drawings.

BRIEF DESCRIPTION OF DRAWINGS

To more clearly illustrate the technical solutions in the embodiments of the present application or the related art, the accompanying drawings required for describing the embodiments or the related art will be briefly introduced below. Obviously, the drawings in the following description are merely some embodiments of the present application. For those skilled in the art, other drawings can be obtained on the basis of the provided drawings without creative efforts.

DETAILED DESCRIPTION OF THE EMBODIMENTS

Figure 1:
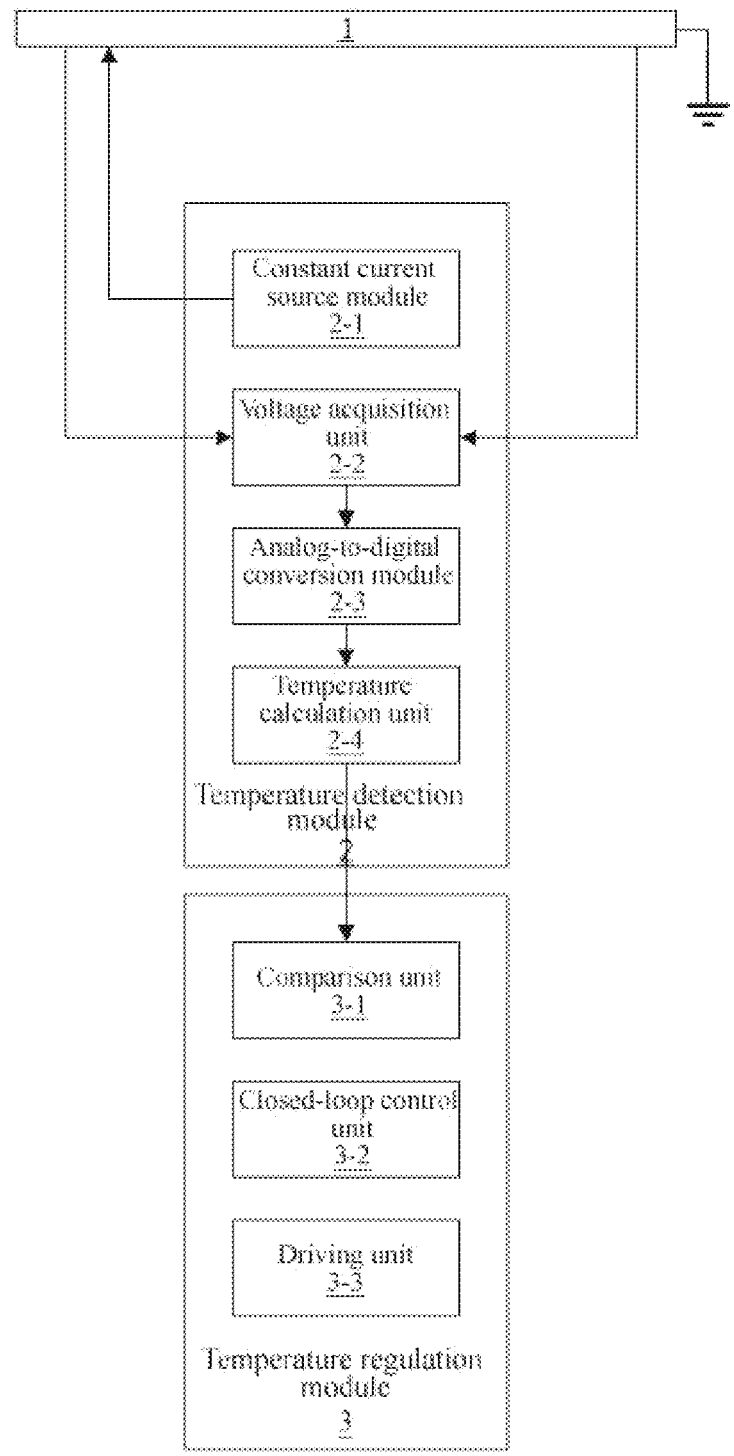
FIG. 1 is a schematic diagram showing a structure of a temperature-sensitive PTC heating wire in an embodiment of the present application.

To make the objectives, technical solutions, and advantages of this application clearer, the technical solutions in the embodiments of this application will be described clearly and completely below in conjunction with the accompanying drawings in the embodiments. Obviously, the described embodiments are only some of the embodiments of this application, rather than all of the embodiments thereof. On the basis of the embodiments of this application, all other embodiments obtained by those skilled in the art without creative efforts shall fall within the scope of protection of this application. Where there is no conflict, the embodiments of this application and the features therein may be combined with each other in any manner. Moreover, although a logical sequence is shown in the flowchart, the steps shown or described herein may be performed in a different order in some cases.

The terms "first", "second", etc. in the description and claims of this application, as well as in the accompanying drawings, are used to distinguish similar objects and are not necessarily intended to describe a specific order or sequence. It should be understood that the numbers used in such manner may be interchanged where appropriate, so that the embodiments of this application described herein can be implemented in sequences other than those illustrated or described herein.

A brief description to the design concept of the embodiments of this application is as follows.

Existing heating wires typically rely on multiple external NTC temperature sensors to accurately monitor temperature changes, which significantly increases system complexity and cost. Over prolonged use, these temperature sensors may experience aging or reduced accuracy, leading to delayed responses or even errors in temperature control systems, thereby failing to effectively regulate temperature. This not only affects temperature control precision but may also cause temperature fluctuations, degrading user experience.

In view of this, an embodiment of the present application provides a temperature-sensitive PTC heating wire and a control method therefor. The temperature-sensitive PTC heating wire includes:

a first metal wire, a temperature detection module, and a temperature regulation module; the first metal wire is configured to generate heat after being powered on; the first metal wire has a known temperature-resistance relationship and a positive temperature coefficient (PTC) characteristic; the temperature detection module is configured to acquire a real-time resistance of the first metal wire, and calculate a real-time temperature of the first metal wire on the basis of the temperature-resistance relationship; and the temperature regulation module is configured to compare the real-time temperature with a preset target temperature, and regulate the real-time temperature to the preset target temperature by means of closed-loop control. This enables the first metal wire to serve as both a heating wire and a temperature sensor, eliminating the need for an additional NTC temperature sensor probe while ensuring controllable heating temperatures.

The preferred embodiments of the present application will be described below with reference to the accompanying drawings in the description. It should be understood that the preferred embodiments described herein are only for illustrating and explaining the present application, and are not intended to limit the present application. Moreover, the embodiments in the present application and the features therein may be combined with each other where there is no conflict.

An embodiment of the present application provides an application scenario. In this application scenario, a terminal device 101 and a server 102 are included. The terminal device 101 and the server 102 communicate with each other via a communication network.

The terminal device 101 is an electronic device used by a target object. The electronic device may be a personal computer, a mobile phone, a tablet, a laptop, an e-book reader, a vehicle-mounted terminal, etc. Furthermore, a replenishment-related client may be installed on the terminal device 101. The client may be software (for example, an app, a browser, etc.), a webpage, a mini-program, etc. The target object may use a warehouse site selection-related client on terminal device 101 to perform warehouse site selection-related operations.

The server 102 may be an independent physical server, an edge device 102 in the field of cloud computing, or a cloud server that provides fundamental cloud computing services such as cloud services, cloud databases, cloud computing, cloud storage, cloud functions, network services, cloud communications, middleware services, domain name services, security services, content delivery network (CDN) as well as big data and artificial intelligence platforms.

There is no limitation to the quantity of the terminal device 101 and/or server 102.

It should be noted that the control method for the temperature-sensitive PTC heating wire in this embodiment of this application may be executed by the terminal device 101 or the server 102 alone, or may be executed jointly by the terminal device 101 and the server 102. For example, when said control method is executed jointly by the terminal device 101 and the server 102, the server 102 may receive supply point information of a supply point and receiving point information of a receiving point created by a target object, as well as the target quantity of candidate warehouses. Then, initial location information for multiple candidate warehouses is generated on the basis of the target quantity. Subsequently, a coverage relationship and a supply relationship are determined on the basis of the initial location information, the supply point information, and the receiving point information. Next, a total transportation cost is determined on the basis of the coverage relationship and the supply relationship. If the total transportation cost satisfies a preset cost condition, the initial location information is determined as target location information for the candidate warehouses. The terminal device 102 may receive the target location information and present same to the target object, such that the target object selects a warehouse on the basis of the target location information.

A temperature-sensitive PTC heating wire provided in an exemplary embodiment of the present application will be described below in conjunction with the above application scenario with reference to the accompanying drawings. It should be noted that the above application scenario is shown merely to facilitate understanding of the spirit and principles of this application, and the embodiments of this application are not limited in any way in this regard.

Figure 2:
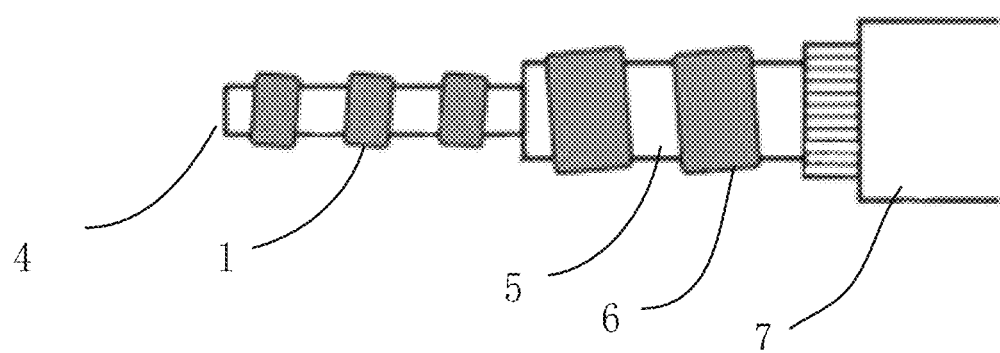
FIG. 2 is a schematic diagram of showing a structure a temperature-sensitive PTC heating wire without a temperature detection module and a temperature regulation module, in an embodiment of the present application.

Referring to FIG. 1 and FIG. 2, a temperature-sensitive PTC heating wire provided in this embodiment of the application includes a first metal wire 1, a temperature detection module 2, and a temperature regulation module 3;

the first metal wire 1 is configured to generate heat after being powered on;

the first metal wire 1 has a known temperature-resistance relationship and a positive temperature coefficient (PTC) characteristic;

the temperature detection module 2 is configured to acquire a real-time resistance of the first metal wire 1, and calculate a real-time temperature of the first metal wire 1 on the basis of the temperature-resistance relationship; and the temperature regulation module 3 is configured to compare the real-time temperature with a preset target temperature, and regulate the real-time temperature to the preset target temperature by means of closed-loop control.

In this embodiment, specifically, provided is a temperature-sensitive PTC heating wire based on a PTC (positive temperature coefficient) material, being suitable for various heating devices that require precise temperature regulation, such as household appliances, electronic products, and industrial heating equipment. The PTC heating wire achieves real-time temperature monitoring and precise regulation by means of the collaborative operation of the first metal wire 1, the temperature detection module 2, and the temperature regulation module 3.

The first metal wire 1 has a known temperature-resistance relationship and a positive temperature coefficient (PTC) characteristic. When current flows through the first metal wire 1, the resistance of the first metal wire 1 increases with the increase of temperature, thereby achieving temperature self-limiting. Furthermore, on the basis of the resistance-temperature characteristic curve of the first metal wire 1, the real-time temperature can be directly calculated by measuring the resistance value of the first metal wire 1 without the need for an additional temperature sensor.

The temperature detection module 2 is configured to monitor the resistance value of the first metal wire 1 in real time, and convert the resistance value into a real-time temperature on the basis of the known temperature-resistance relationship. Therefore, temperature changes of the first metal wire 1 can be accurately acquired during the operation of the temperature-sensitive PTC heating wire, and real-time temperature information can be continuously fed back by means of the first metal wire 1.

The temperature regulation module 3 compares the real-time temperature provided by the temperature detection module 2 with a preset target temperature, and if there is a discrepancy between the real-time temperature and the preset target temperature, regulates the current supply to the first metal wire 1 by means of closed-loop control, thereby regulating the heating process to cause the real-time temperature to approach or be maintained at the set target temperature.

In this embodiment, since no additional temperature sensor is needed, the design of the temperature-sensitive PTC heating wire is concise and reliable. The temperature feedback is achieved by means of the PTC characteristic of the first metal wire 1 itself, reducing cost and complexity. In some possible embodiments, the temperature detection module 2 includes:

a constant current source module 2-1, configured to provide a constant current to the first metal wire 1;

a voltage acquisition unit 2-2, configured to acquire a real-time voltage across both ends of the first metal wire in real time;

an analog-to-digital conversion module 2-3, configured to calculate a real-time resistance value of the first metal wire 1 on the basis of the real-time voltage and the constant current; and a temperature calculation unit 2-4, configured to convert the real-time resistance value into a real-time temperature value.

In this embodiment, the temperature detection module 2 is configured to acquire the real-time resistance of the first metal wire 1, and calculate the real-time temperature of the first metal wire 1 on the basis of the temperature-resistance relationship.

The constant current source module 2-1 supplies a constant current to the first metal wire 1 during a sampling time slot, ensuring that the current remains unchanged during the measurement process, thereby ensuring a direct relationship between the voltage and the resistance.

The sampling time slot refers to a specific time period, during which no heating current flows through the first metal wire 1, in a heating process of the first metal wire 1. The heating current may fluctuate over time, which could affect the stability of the current and thus the accuracy of resistance measurement. Therefore, the constant current source module 2-1 operates independently during the sampling time slot, and the heating current is switched off or disconnected to avoid interference from its fluctuations on real-time resistance measurements. As the constant current provided by the constant current source module 2-1 is not affected by the heating current, the resistance value of the metal wire can be accurately measured.

The specific process is as follows. During a heating phase, a heating power supply provides a heating current, which follows through and heats up the first metal wire 1. At this time, the resistance of the first metal wire 1 increases with the increase in temperature, and the heating process of the first metal wire 1 is controlled. When a sampling time slot begins, the heating current is disconnected and switched to a stable current provided by the constant current source module (2-1), and the resistance at this time is measured.

During the sampling time slot, the change in resistance of the first metal wire 1 is only caused by the constant current from the constant current source module 2-1 and is not affected by the heating current. The interference from the heating current can be eliminated by ensuring that only the constant current follows through the first metal wire during the sampling time slot. Therefore, the temperature of the first metal wire 1 can be accurately calculated by means of precise current control and measurement.

The voltage acquisition unit 2-2 acquires a voltage value across both ends of the first metal wire 1 (preferably both ends of the entire length of the first metal wire 1) in real time.

Since the current provided by the constant current source module 2-1 is known and constant, the change in real-time resistance can be determined by measuring the real-time voltage. The analog-to-digital conversion module 2-3 receives data (the real-time voltage) from the voltage acquisition unit 2-2, converts the real-time voltage from an analog signal to a digital signal, and then calculates the real-time resistance value of the first metal wire 1 on the basis of the real-time voltage and the constant current.

The temperature calculation unit 2-4 uses a known temperature-resistance relationship to convert the real-time resistance value provided by the analog-to-digital conversion module 2-3 into an actual temperature value as a real-time temperature value for subsequent use by the temperature regulation module 3.

In some possible embodiments, the constant current source module 2-1 provides a constant current ranging from 10 mA to 200 mA.

In this embodiment, during resistance measurement, a low and appropriate constant current should be selected to avoid excessive temperature effects.

Low current (10 mA to 100 mA) is suitable for high-resistance materials (such as high-resistance metal wires), effectively preventing temperature changes caused by current.

Moderate current (100 mA to 500 mA) is suitable for metal wires with a general range of resistance avoiding excessive temperature rise while ensuring the collection of sufficient voltage signals for resistance calculation.

High current (500 mA to 1 A) is suitable for the measurement of low-resistance metal wires, ensuring significant voltage changes.

In some possible embodiments, two voltage sampling points of the voltage acquisition unit 2-2 are respectively provided at a connection between an output terminal of the constant current source module 2-1 and one end of the first metal wire 1, and at a connection between a ground terminal of the constant current source module 2-1 and the other end of the first metal wire 1.

In this embodiment, one voltage sampling point is located at a connection between an output terminal of the constant current source module 2-1 and one end of the first metal wire 1. The voltage drop caused by the current flowing from the constant current source module into the first metal wire is directly acquired at this point. The other voltage sampling point is located at a connection between a ground terminal of the constant current source module 2-1 and the other end of the first metal wire 1. The voltage value at the other end of the first metal wire relative to the ground (GND) is collected at this point. The difference between the two voltage values indicates the actual voltage difference between the two ends of the first metal wire. By performing voltage sampling at the two key points, the voltage acquisition unit 2-2 can accurately acquire the voltage drop across the two ends of the first metal wire 1 due to resistance. This not only improves measurement accuracy but also reduces the impact of external noise and interference on the measurement results.

In some possible embodiments, the temperature regulation module 3 includes:
   a comparison unit 3-1, configured to compare a real-time temperature value with a preset target temperature value to generate a temperature error signal;
   a closed-loop control unit 3-2, configured to generate a closed-loop control signal on the basis of the temperature error signal; and
   a driving unit 3-3, configured to regulate an output power of a power supply on the basis of the closed-loop control signal so as to control a heating power of the first metal wire 1.

In this embodiment, the comparison unit 3-1 compares a real-time temperature value acquired from the temperature calculation unit 2-4 with a target temperature value preset by the user or the factory. During this process, a temperature error signal is generated, which indicates the difference between the actual temperature and the target temperature.

The closed-loop control unit 3-2 performs algorithms, such as PID control, on the basis of the temperature error signal generated by the comparison unit 3-1 so as to calculate an appropriate closed-loop control signal.

The driving unit 3-3 receives the closed-loop control signal from the closed-loop control unit 3-2, and uses PWM (Pulse Width Modulation) to regulate a power output supplied to the constant current source module 2-1. The driving unit 3-3 may include a PWM controller that generates a corresponding PWM waveform on the basis of the closed-loop control signal. After being processed by power amplification or other circuits, the PWM waveform directly acts on the heating power supply, thereby regulating the magnitude of the heating current supplied to the first metal wire 1. This ensures precise regulation of the heating power supply output, thereby achieving effective control of the heating rate of the first metal wire 1.

This process not only improves the energy efficiency of the temperature-sensitive PTC heating wire but also enhances its dynamic response capability, enabling the temperature-sensitive PTC heating wire to maintain stable temperature output under various conditions.

In some possible embodiments, the temperature-sensitive PTC heating wire further includes a supporting core 4 and a first cladding layer 5;
   both the supporting core 4 and the first cladding layer 5 are made of an insulating material;
   the first metal wire 1 is helically wound around the supporting core 4 at a preset first pitch; and
   the first cladding layer 5 is wrapped around the first metal wire 1.

In this embodiment, pure nickel metal is drawn into a heating nickel wire with a temperature-controlled coefficient by means of a specialized metal wire drawing machine, and then the drawn first metal wire 1 is wound around the supporting core 4 (a polyester thread) at a certain interval (pitch) by means of a specialized winding machine.

The polyester thread wound with the pure nickel wire is extruded by means of a wire extruder with a first cladding layer 5 to form an intermediate layer heating wire.

In some possible embodiments, the temperature-sensitive PTC heating wire further includes a second metal wire 6 and a second cladding layer 7;
   the second metal wire is helically wound around the outer sidewall of the first cladding layer 5 at a preset second pitch; and the second cladding layer 7 is wrapped around the second metal wire 6.

In this embodiment, a drawn copper wire is wound around the intermediate layer heating wire by means of a winding machine.

Next, the intermediate layer heating wire wound with the copper wire is first wrapped with a PVC plastic film tape with a maximum temperature resistance of 115 degrees Celsius by means of a wire extruder, and then the final temperature-sensitive PTC heating wire is produced by means of a wire extruder.

In some possible embodiments, the first metal wire 1 is a nickel wire, and the second metal wire 6 is a copper wire.

In this embodiment, the nickel wire has a positive temperature coefficient (PTC) characteristic, and thus is very suitable for use as a temperature-sensitive element. Furthermore, when current flows through the nickel wire, the nickel wire generates heat due to its resistive properties so as to heat a target area, which also makes the nickel wire suitable for use as a heating element. Using a known temperature-resistance relationship of the nickel wire, by measuring the voltage across both ends of the nickel wire in combination with a constant current, the real-time resistance of the nickel wire can be calculated and then converted into a real-time temperature. This allows the nickel wire to not only provide heating but also deliver precise temperature feedback.

The copper wire, which serves as the second metal wire 6, provides heat dissipation, ensuring uniform and stable temperature distribution across the entire temperature-sensitive PTC heating wire, thereby enhancing the overall heating performance of the temperature-sensitive PTC heating wire.

In some possible embodiments, both the first cladding layer 5 and the second cladding layer 7 are polyvinyl chloride layers, and the first cladding layer 5 and the second cladding layer each have a thickness ranging from 0.1 mm to 0.5 mm.

In this embodiment, the first cladding layer 5 is wrapped around the first metal wire 1, providing insulation and protection while preventing direct contact between the first metal wire 1 and the external environment to avoid short circuits or oxidative corrosion. The second cladding layer 7 is wrapped around the second metal wire 6, providing insulation and protection, while enhancing the durability of the second metal wire 6 to prevent mechanical damage or chemical corrosion.

The thickness ranges from 0.1 mm to 0.5 mm, which does not significantly affect heat conduction while providing sufficient protection.

A control method for a temperature-sensitive PTC heating wire includes following steps of:
  acquiring a real-time resistance of a first metal wire 1, and calculating a real-time temperature of the first metal wire 1 on the basis of a temperature-resistance relationship, wherein
  the first metal wire 1 has a known temperature-resistance relationship and a positive temperature coefficient (PTC) characteristic; and
  comparing the real-time temperature with a preset target temperature, and regulating the real-time temperature to the preset target temperature by means of closed-loop control.

In some possible embodiments, the temperature-sensitive PTC heating wire according to the present application may at least include a processor and a memory. The memory stores program code that, when executed by the processor, causes the processor to perform the steps in the control method for the temperature-sensitive PTC heating wire according to various exemplary embodiments described in the description.

On the basis of the same inventive concept, an embodiment of the present application further provides an electronic device capable of implementing the functions of the control method for the temperature-sensitive PTC heating wire. The electronic device includes:
  at least one processor 801, and a memory 802 connected with the at least one processor 801. The specific connection medium between the processor 801 and the memory 802 is not limited in this embodiment of this application.

In this embodiment of this application, the memory 802 stores instructions executable by the at least one processor 801. By executing the instructions stored in the memory 802, the at least one processor 801 can perform the control method for the temperature-sensitive PTC heating wire. The processor 801 can implement the functions of various modules in the device shown in FIG. 1.

The processor 801, which serves as the control center of the device, can connect with all parts of the entire control device by means of various interfaces and lines. By running or executing instructions stored in the memory 802 and calling data stored in the memory 802, the processor can perform various functions of the device and process data, thereby providing overall monitoring of the device.

In a possible design, the processor 801 may include one or more processing units. The processor 801 may integrate an application processor and a modem processor. The application processor mainly processes the operating system, user interface, and application programs, while the modem processor mainly processes wireless communication. It should be understood that the modem processor may also not be integrated into the processor 801. In some embodiments, the processor 801 and the memory 802 may be implemented on the same chip, while in other embodiments, they may be implemented on separate chips.

The processor 801 may be a general-purpose processor, such as a central processing unit (CPU), a digital signal processor, an application-specific integrated circuit, a field-programmable gate array or other programmable logic device, a discrete gate or transistor logic device, or a discrete hardware component, capable of implementing or executing the methods, steps, and logic block diagrams disclosed in the embodiments of this application. The general-purpose processor may be a microprocessor or any conventional processor. The steps of the control method for the temperature-sensitive PTC heating wire disclosed in the embodiments of this application may be directly embodied as being executed by a hardware processor or may be executed by a combination of hardware and software modules in the processor.

The memory 802 is a non-volatile computer-readable storage medium that may be used to store non-volatile software programs, non-volatile computer-executable programs and modules. The memory 802 may include at least one type of storage medium, such as a flash memory, a hard disk, a multimedia card, a card-type memory, a random access memory (RAM), a static random access memory (SRAM), a programmable read only memory (PROM), a read-only memory (ROM), an electrically erasable programmable read-only memory (EEPROM), a magnetic memory, a magnetic disk, an optical disk, etc. The memory 802 is any other medium capable of carrying or storing desired program code in the form of instructions or data structures and accessible by a computer, but is not limited thereto. In the embodiments of this application, the memory 802 may also be a circuit or any other device capable of implementing storage functions, for storing program instructions and/or data.

By designing and programming the processor 801, the code corresponding to the temperature-sensitive PTC heating wire described in the above embodiments can be embedded into a chip, enabling the chip to execute the steps of the control method for the temperature-sensitive PTC heating wire during operation. The process of designing and programming the processor 801 is well-known to those skilled in the art and will not be described here.

On the basis of the same inventive concept, an embodiment of the present application further provides a storage medium storing computer instructions that, when executed on a computer, cause the computer to execute the control method for the temperature-sensitive PTC heating wire as discussed above.

In some possible embodiments, various aspects of the control method for the temperature-sensitive PTC heating wire provided in this application may also be implemented in the form of a program product including program code that, when the program product is run on a device, causes the device to execute the steps of the control method for the temperature-sensitive PTC heating wire according to various exemplary embodiments described above in the description.

Those skilled in the art should understand that the embodiments of the present application may be provided as methods, systems, or computer program products. Therefore, the present application may take the form of an entirely hardware embodiment, an entirely software embodiment, or an embodiment combining software and hardware aspects. Furthermore, the present application may take the form of a computer program product implemented on one or more computer-usable storage media (including but not limited to disk storage, CD-ROM, optical storage, etc.) containing computer-usable program code.

The present application is described with reference to flowcharts and/or block diagrams of methods, devices (systems), and computer program products according to the embodiments of the application. It should be understood that each process and/or block in the flowcharts and/or block diagrams, as well as combinations of processes and/or blocks in the flowcharts and/or block diagrams, can be implemented by computer program instructions. These computer program instructions may be provided to a processor of a general-purpose computer, a special-purpose computer, an embedded processor, or other programmable data processing device to produce a machine, such that the instructions executed by the processor of the computer or other programmable data processing device generate means for implementing the functions specified in one or more processes of the flowcharts and/or one or more blocks of the block diagrams.

These computer program instructions may also be stored in a computer-readable memory that can direct a computer or other programmable data processing device to function in a particular manner, such that the instructions stored in the computer-readable memory produce a product of manufacture including instruction means that implement the functions specified in one or more flows of the flowcharts and/or one or more blocks of the block diagrams.

These computer program instructions may also be loaded onto a computer or other programmable data processing device, causing a series of operational steps to be executed on the computer or other programmable device to produce computer-implemented processing. Thus, the instructions executed on the computer or other programmable device provide steps for implementing the functions specified in one or more processes of the flowcharts and/or one or more blocks of the block diagrams.

It is apparent that those skilled in the art can make various modifications and variations to the present application without departing from the spirit and scope thereof. Thus, if such modifications and variations of the present application fall within the scope of the claims of the present application and their equivalents, the present application is also intended to include these modifications and variations.

What is claimed is:

1. A temperature-sensitive PTC heating wire, comprising a first metal wire (1), a temperature detection module (2), and a temperature regulation module (3);
   the first metal wire (1) is configured to generate heat when a heating current flows therethrough;
   the first metal wire (1) has a known temperature-resistance relationship and a positive temperature coefficient (PTC) characteristic;
   the temperature detection module (2) is configured to acquire a real-time resistance of the first metal wire (1), and calculate a real-time temperature of the first metal wire (1) on the basis of the temperature-resistance relationship;
   the temperature regulation module (3) is configured to compare the real-time temperature with a preset target temperature, and regulate the real-time temperature to the preset target temperature by means of closed-loop control; and
   wherein the temperature detection module (2) comprises a constant current source module (2-1), configured to provide a constant current to the first metal wire (1) during a sampling time slot; the sampling time slot being a time period, during which no heating current flows through the first metal wire (1), in a heating process of the first metal wire (1);
   a voltage acquisition unit (2-2), configured to acquire a real-time voltage across both ends the first metal wire in real time;
   an analog-to-digital conversion module (2-3), configured to calculate a real-time resistance value of the first metal wire (1) on the basis of the real-time voltage and the constant current; and
   a temperature calculation unit (2-4), configured to convert the real-time resistance value into a real-time temperature value.

2. The temperature-sensitive PTC heating wire according to claim 1, wherein the constant current source module (2-1) provides a constant current ranging from 10 mA to 200 mA.

3. The temperature-sensitive PTC heating wire according to claim 1, wherein two voltage sampling points of the voltage acquisition unit (2-2) are respectively provided at a connection between an output terminal of the constant current source module (2-1) and one end of the first metal wire (1), and at a connection between a ground terminal of the constant current source module (2-1) and the other end of the first metal wire (1).

4. The temperature-sensitive PTC heating wire according to claim 1, wherein the temperature regulation module (3) comprises:
   a comparison unit (3-1), configured to compare a real-time temperature value with a preset target temperature value to generate a temperature error signal;
   a closed-loop control unit (3-2), configured to generate a closed-loop control signal on the basis of the temperature error signal; and a driving unit (3-3), configured to regulate an output power of a heating power supply on the basis of the closed-loop control signal, so as to control a heating power of the first metal wire (1).

5. The temperature-sensitive PTC heating wire according to claim 1, further comprising a supporting core (4) and a first cladding layer (5);

both the supporting core (4) and the first cladding layer (5) are made of an insulating material;

the first metal wire (1) is helically wound around the supporting core (4) at a set first pitch; and the first cladding layer (5) is wrapped around the first metal wire (1).

6. The temperature-sensitive PTC heating wire according to claim 5, further comprising a second metal wire (6) and a second cladding layer (7);

the second metal wire is helically wound around the outer sidewall of the first cladding layer (5) at a set second pitch; and the second cladding layer (7) is wrapped around the second metal wire (6).

7. The temperature-sensitive PTC heating wire according to claim 6, wherein the first metal wire (1) is a nickel wire, and the second metal wire (6) is a copper wire.

8. The temperature-sensitive PTC heating wire according to claim 7, wherein both the first cladding layer (5) and the second cladding layer (7) are polyvinyl chloride layers, and the first cladding layer (5) and the second cladding layer each have a thickness ranging from 0.1 mm to 0.5 mm.

* * * * *